3,655,807
DODECYLBENZENESULFONIC ACID ADDITION
IN SULFURIC ACID ALKYLATION
Marvin S. Rakow, East Brunswick, and William H. Lockwood, Jr., Hightstown, N.J., assignors to Cities Service Oil Company, Tulsa, Okla.
No Drawing. Filed Oct. 30, 1970, Ser. No. 85,743
Int. Cl. C07c 3/54
U.S. Cl. 260—683.63                              3 Claims

ABSTRACT OF THE DISCLOSURE

An improvement for a conventional alkylation process is disclosed in which a low molecular weight olefin and an isoparaffin are mixed in contact with an acid catalyst at controlled temperatures. The improvement comprises the addition of small concentrations of dodecylbenzenesulfonic acid to improve the quality and yield of the desired branched chain paraffinic isomers or alkylate produced in the gasoline boiling range.

BACKGROUND OF THE INVENTION

The present invention relates to a process for the improvement of gasoline production by alkylation. In such alkylation processes, isoparaffins are contacted with olefins in the presence of a suitable catalyst to produce branched chain paraffinic isomers.

Catalysts utilized in the alkylation reaction include sulfuric acid, bromine chloride, aluminum chloride, double halides of alkali metals with aluminum and hydrogen fluoride. Acid catalysts such as sulfuric acid or hydrofluoric are most common. Sulfuric acid has been widely used as the catalyst in most commercial installations due to its relative accessibility and easy handling.

In the utilization of the sulfuric acid process, normally isoparaffin and olefins are reacted usually at pressures up to about 500 p.s.i. and temperatures ranging from about 450° F. down to below 0° F. Isobutane and butene are among the more commonly used feed materials. The absorption of olefinic hydrocarbons occurs at a rate several hundred times as fast as the absorption of the isoparaffins and hence, in order to maintain the proper concentration of the two hydrocarbons in the acid, it is necessary to recycle a large excess of saturated hydrocarbons through the system. The higher the ratio of isoparaffins to olefins in the feedstock, the greater the yield, the higher the octane number and the smaller the acid consumption. Therefore, this ratio is always held higher than five to one, or even eight to one in producing the very highest octane number alkylate. Contact times of about five minutes appear to be satisfactory, but commercial plants often operate within contact times of 20 to 40 minutes. Acid strengths of 98% by weight may be utilized, but the acid becomes diluted with hydrocarbon during the processing to about 90% by weight. The dilution curtails the yield and quality of alkylates from the process. The inherent problem, however, in the alkylation process is the adequate contacting of the olefins and isoparaffins within the reaction vessel so that high alkylate yields of high quality gasoline in the desired fuel range are produced. What is required is a process for the improvement of the alkylation process so that desired branched chain paraffinic isomers within the gasoline boiling range of about 75° F. to 350° F. are yielded.

It is an object of the present invention to provide a process for the improvement of alkylation of isoparaffins and olefins.

It is a further object of the present invention to provide a process by which small concentrations of dodecylbenzenesulfonic acid may be introduced into the alkylation process for the improvement of quality and yield of the alkylates produced.

It is a further object of the present invention to provide a process by which the water content of the alkylation acid may be controlled within a desired concentration in conjunction with the addition of small concentrations of dodecylbenzenesulfonic acid to the alkylation acid catalyst such that gasoline boiling range alkylates are produced exhibiting a higher octane quality than that obtainable by conventional alkylation processes.

With these and other objects in mind, the present invention will be more fully understood by particular reference to the following description:

SUMMARY OF THE INVENTION

The objects of the present invention are accomplished by carrying out the alkylation reaction in the presence of dodecylbenzenesulfonic acid so that a more uniform mixing and contacting of the isoparaffin and olefins with the alkylation catalyst is achieved.

In general, the alkylation acid utilized is sulfuric acid. It has been found preferred that the sulfuric acid contain about 0.5 to about 3.5 weight percent water. It has also been found preferred that the dodecylbenzenesulfonic acid be utilized in concentrations of from about 0.01 to about 2.0 weight percent.

The improved process of the present invention may further comprise separating the alkylate produced by alkylation from the alkylation acid and unreacted isoparaffin-olefin mixture and recycling the alkylation acid and unreacted isoparaffin-olefin mixture to the reaction zone. The alkylation acid recycle stream may be purged when the acid strength becomes below about 85 weight percent to further enhance the alkylation process and the quality and yield of the alkylate produced.

DETAILED DESCRIPTION OF THE INVENTION

The proposed bans on the use of tetraethyl lead and other gasoline additives which normally increase the octane number of the gasoline, have made the advent of higher quality and greater yield of alkylate production from alkylation of isoparafins and olefins a necessity. Obviously, the refinery will need to drastically change processes for the manufacture of gasoline and, in particular, increase reforming and alkylation so that a higher grade gasoline, which will not form dangerous pollutants, may be obtained.

The process of the present invention is an improvement upon the alkylation of isoparaffins and olefins over the conventional process of introducing ispraffins and olefins in a reaction zone and thereby mixing them with fresh alkylation acid to produce an alkylate from the reaction zone. The improvement of the present invention comprises the introduction of dodecylbenzenesulfonic acid to act as a surfactant between the isoparaffin-olefin mixture and the alkylation acid. This surfactant introduction exhibits a greater yield of alkylate which may be produced from a given reaction vessel under normal conditions.

In most alkylation processes, the alkylation acid catalyst is sulfuric acid. It has been found that the addition of dodecylbenzenesulfonic acid in amounts from about 0.01 to about 2.0 weight percent of dodecylbenzenesulfonic acid based on alkylation acid, will increase greatly the alkylate yield from the reaction vessel. The dodecylbenzenesulfonic acid may be added to the reaction zone in any suitable manner, but is conveniently added with the fresh alkylation acid introduced to the process.

Example

Experimental tests were made in a batch reaction vessel in which 1-butene and isobutane were contacted with sulfuric acid and various concentrations of dodecylbenzenesulfonic acid. Representative of these examples are the results shown in the following table depicting a base run, in which the isoparaffin-olefin mixture and alkylation acid were utilized without the improved alkylation process of the present invention and several experimental runs are presented utilizing dodecylbenzenesulfonic acid (DBSA) concentrations of 0.1% to 1.5% by weight. The results show the amount of gasoline produced and the weight percent yield of trimethylpentanes in the gasoline fraction.

TABLE

| Catalyst | Vol. percent yield of IBP–350° F. gasoline fraction | Weight percent yield of trimethyl-pentanes |
| --- | --- | --- |
| 97.5% $H_2SO_4$ (base run) | 80.8 | 65.5 |
| 97.5% $H_2SO_4$ plus 0.1% DBSA | 84.5 | 67.5 |
| 97.5% $H_2SO_4$ plus 0.5% DBSA | 84.8 | 75.6 |
| 97.5% $H_2SO_4$ plus 1.0% DBSA | 87.0 | 76.2 |
| 97.5% $H_2SO_4$ plus 1.5% DBSA | 86.4 | 71.1 |

It can be seen from the results given in the table that the gasoline fraction is increased significantly with the introduction of a small amount of dodecylbenzenesulfonic acid, with the yield of trimethylpentanes being drastically increased over the base run which did not utilize the improved process of the present invention. The increase of trimethylpentanes in the gasoline fraction increases the octane number of the gasoline fraction and thereby allows a lesser use of tetraethyl lead and other gasoline additives for the improvement of the gasoline octane number and its burning capacity in internal combustion engines.

As mentioned, the studies illustrate that the use from about 0.01 to about 2.0 weight percent dodecylbenzenesulfonic acid introduced into fresh alkylation acid produces the optimum yield and quality of alkylate. Other studies in conjunction with the alkylation process and the use of surfactants therein have shown that the use of sulfuric acid containing from about 0.5 to about 3.5 weight percent water aids in increasing the concentration of alkylate and trimethylpentanes formed. Therefore, it is preferred that the sulfuric acid contain the stated quantities of water and dodecylbenzenesulfonic acid. It has been found, however, that the sulfuric acid concentration in the reaction zone can be as low as 85 weight percent to obtain the quality and yields disclosed. In particular, by the addition of dodecylbenzenesulfonic acid the alkylate yield and quality may be increased over the results of conventional alkylation processes. Although alkyl aryl sulfonic acids have surfactant properties which would enhance the present process, it has been found that they cause foaming within the reaction zone and therefore are undesirable.

It is also within the process of the present invention that the alkylate be separated from the alkylation acid and unreacted isoparaffin-olefin mixture produced from the reaction zone and the alkylation acid be recycled with the unreacted isoparaffin-olefin mixture to the reaction zone for further consumption. In conjugation with the recycling of the alkylation acid, the alkylation acid is purged when the acid strength drops below about 85 weight percent acid such that the acid concentration within the reaction zone will be maintained at a level of alkylation acid desirable for high yields of quality alkylate.

Through the control of the water content of the alkylation acid, acids may be utilized in acid strengths of about at least 85% with the advantage of decreased acid consumption as the acid may be used for a considerably longer reaction time before purging is required. It is not readily understood what the criteria between water content of the alkylation acid and the addition of the alkyl-aryl sulfonic acids is chemically. It has been found that the optimum water content, as stated herein, in the sulfuric acid will change with temperature and other operating variables, particularly agitation. Based upon the theory of alkylation, it is expected that the water content, agitation, isoparaffin to olefin feed ratio, space velocity, reaction time and dilution by organics in the alkylation acid, effect the alkylation process. Experimentation has shown the concentration of protons or $H_3O^+$ ions in the reaction vessel to be critical. It is possible, therefore, through the process of the present invention that the acid consumption within an alkylation unit could be essentially zero, or at least probable that it will be reduced to about 0.1 pound of acid per gallon of alkylate produced.

By the use of the process of the present invention for the improvement of the alkylation process in refineries, it it likely that gasolines may be utilized lead free, so that excess hydrocarbons in the particulate content of exhaust gases and lead particle poisoning of catalytic mufflers may be avoided in conjunction with reduction of the nitrous and nitric oxide emissions from internal combustion engines. The general ecology of the area of the use of the internal combustion engine will be bettered through the use of the higher octane gasolines formed by the alkylation process presented herein. Therefore, by the use of the process of the present invention, higher yields of quality alkylate are produced from conventional alkylation reaction vessels. Contamination caused by motor gasolines may be decreased through the elimination of necessary additives to the gasoline normally required to obtain high octane gasolines.

The present invention described herein with respect to the embodiments thereof, it will be appreciated by those skilled in the art, however, that various changes and modifications may be made without departing from the scope of the invention.

Therefore, we claim:

1. In a process for the alkylation of isoparaffins and olefins in the presence of sulfuric acid alkylation catalyst, the improvement comprising carrying out said alkylation reaction with a small addition of dodecylbenzenesulfonic acid.

2. The process of claim 1 in which from about 0.01 to about 2.0 weight percent dodecylbenzenesulfonic acid based on the alkylation acid is present in the reaction.

3. The process of claim 2 in which the sulfuric acid contains about 0.5 to about 3.5 weight percent water.

References Cited

UNITED STATES PATENTS

| 2,413,777 | 1/1947 | Oakley et al. | 260—683.63 |
| 2,425,572 | 8/1947 | Slotterbeck | 260—683.63 |
| 2,462,793 | 2/1949 | Lee | 260—683.58 |
| 3,116,346 | 12/1963 | Van Dyke | 260—683.63 |

DELBERT E. GANTZ, Primary Examiner

G. J. CRASANAKIS, Assistant Examiner